No. 712,388. Patented Oct. 28, 1902.
E. KEMPSHALL.
PLAYING BALL.
(Application filed June 14, 1902.)

(No Model.)

Witnesses:-
Herbert J. Smith
G. W. Pratt

Inventor:-
Eleazer Kempshall
By his Attorney
J. H. Richards.

UNITED STATES PATENT OFFICE.

ELEAZER KEMPSHALL, OF BOSTON, MASSACHUSETTS.

PLAYING-BALL.

SPECIFICATION forming part of Letters Patent No. 712,388, dated October 28, 1902.

Application filed June 14, 1902. Serial No. 111,768. (No model.)

*To all whom it may concern:*

Be it known that I, ELEAZER KEMPSHALL, a citizen of the United States, residing in Boston, in the county of Suffolk and State of Massachusetts, have invented certain new and useful Improvements in Playing-Balls, of which the following is a specification.

This invention relates to playing-balls, and its chief object is to produce at moderate cost a strong and durable ball of great flying power.

Figure 1:
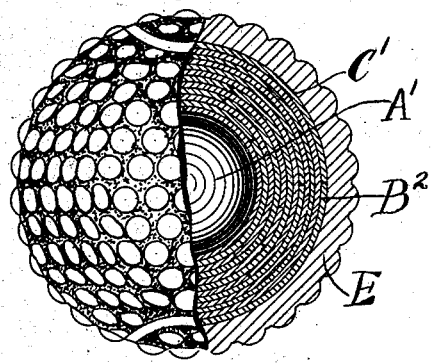
Figure 2:
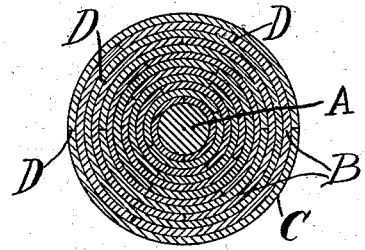
Figure 3:
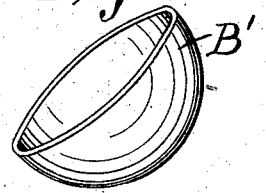

In the drawings forming part of this specification, Figure 1 is a part-sectional view of a golf-ball embodying my present improvements. Fig. 2 is a sectional view illustrating the mode of building up a filling for the ball, and Fig. 3 is a perspective of one of the segments used in building the Fig. 2 device.

Upon a center piece A, preferably of plastic material, such as gutta-percha, I apply one upon another numerous thin laminæ or layers B of approximately pure caoutchouc, thereby forming a solid ball C. Each of the layers preferably consists of hemispherical segments B', as seen at Fig. 3, although said layers may be applied in the form of flat disks, which by pressure may be caused to conform and adhere to the center piece A and also to one another, or, if desired, the rubber plates may be applied in the same manner as the ball-cover sections in application Serial No. 103,221. The caoutchouc is similar to "rubber-dam" or surgeons' rubber and is either unvulcanized or acid-cured. Into the center of the ball C thus formed I inject gutta-percha or other plastic material in the manner illustrated in the patents to F. H. Richards, Nos. 696,351 and 696,353, of March 25, 1902, so as to materially enlarge the center piece A, as at A', Fig. 1, and hence put the layers B of caoutchouc under great tension, each of said layers being materially expanded or stretched, as illustrated at B², Fig. 1. It will be noted that said layers B are originally packed closely together and arranged so as to break joints throughout, as indicated at D, and since they are also adhesive one layer closes the joint in the succeeding layer, and hence there is no leakage of the fluent core material when injected.

By excluding foreign material from the caoutchouc many advantages are gained in constructing a golf-ball which is of small size. Foreign material which is comparatively inelastic not only displaces its bulk of the highly-elastic caoutchouc, but by its presence also interferes with the action thereof. In other words, the mixing of foreign material makes more work to be done and reduces the amount of the caoutchouc for doing the work. Moreover, by using approximately pure caoutchouc in forming the body of the golf-ball it is rendered buoyant in water, so that if accidentally driven into a lake or stream it can be readily located and recovered.

A gutta-percha shell E is preferably formed of hemispherical segments, which may be welded upon the expanded sphere or filling C' under heat and pressure. The layers of caoutchouc by adhering to one another improve the stability and elasticity of the ball. The heat imparted to the ball at the operation of welding the cover-segments causes the caoutchouc segments to adhere more firmly. It will be noted that the heaviest portion of the structure consists of the shell, which lies at the periphery of the ball, and by reason of its momentum when the ball is in rotation tends to prolong the flight thereof.

The principal feature of the invention consists in the injection into a thick sphere of approximately pure caoutchouc of a mass of material which is hardened to form a solid center piece and in so far as this feature is concerned it is obvious that caoutchouc may be otherwise formed into a sphere within the scope of the invention, and it will further be seen that for certain games a cover of other material than gutta-percha may be used or that in some cases the cover may be omitted.

Having described my invention, I claim—

1. A sphere consisting of adherent layers of similar soft elastic material and distended by an injected core.

2. A sphere consisting of a plurality of adherent layers of soft highly-elastic material inflated or distended by a mobile mass injected thereinto, each of said layers consisting of a plurality of segments.

3. In a playing-ball, a spherical shell built up of numerous layers of approximately pure adhering caoutchouc and distended by plastic material injected thereinto.

4. In a playing-ball, a spherical shell built up of layers of caoutchouc and distended by gutta-percha injected thereinto.

5. In combination, a sphere consisting of adherent layers of soft elastic material and distended by an injected core, and a shell of plastic material upon said sphere.

6. In combination, a sphere consisting of a plurality of adherent layers of soft highly-elastic material inflated or distended by a mobile mass injected thereinto, each of said layers consisting of a plurality of segments, and a hard shell of plastic material holding said sphere under compression.

7. In a playing-ball, a spherical shell built up of numerous adherent layers of caoutchouc and inflated or distended by plastic material injected thereinto, and a shell of gutta-percha upon said sphere.

8. In a playing-ball, a spherical shell built up of numerous thin laminæ of caoutchouc and inflated or distended by gutta-percha injected thereinto, and a shell of gutta-percha holding said sphere under compression, each of said laminæ being formed in sections, and said layers adhering to one another.

9. A playing-ball comprising a sphere consisting of laminæ of pure caoutchouc, said laminæ being extremely thin and adherent and said sphere distended by an injected core of gutta-percha, and a shell of gutta-percha holding said sphere under compression.

ELEAZER KEMPSHALL.

Witnesses:
B. C. STICKNEY,
FRED. J. DOLE.